May 6, 1930.   P. G. FRAZIER   1,757,302
ENGINE AND VALVE STRUCTURE
Filed Aug. 2, 1926   2 Sheets-Sheet 1
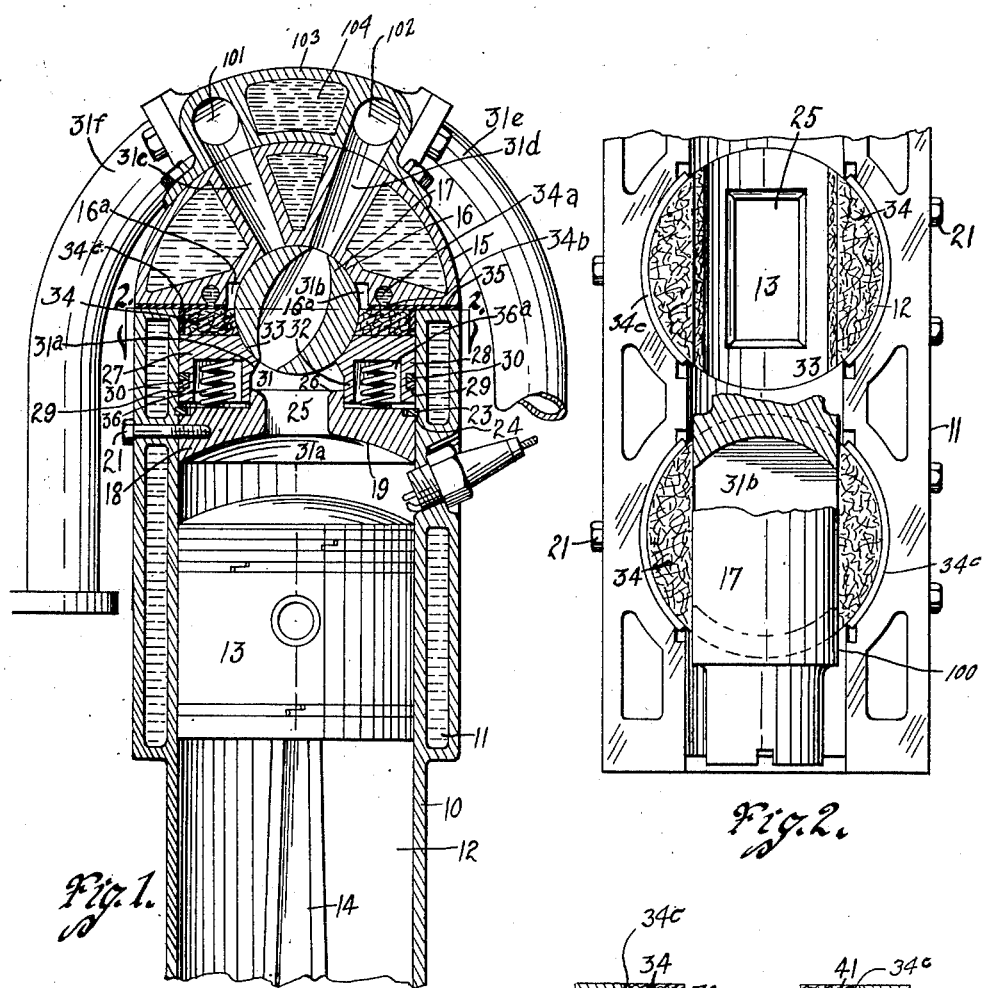
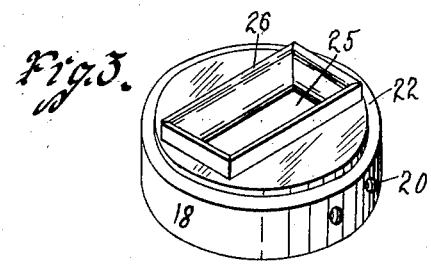
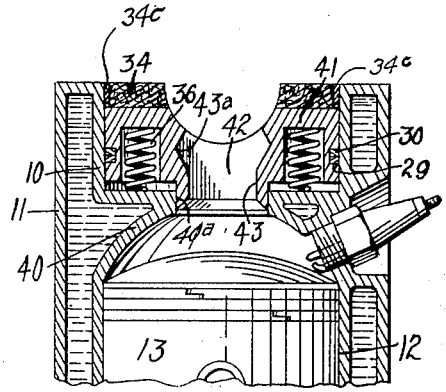
Witness
L. F. Landberg
Inventor
Pearl G. Frazier
by Bair & Freeman Attorneys

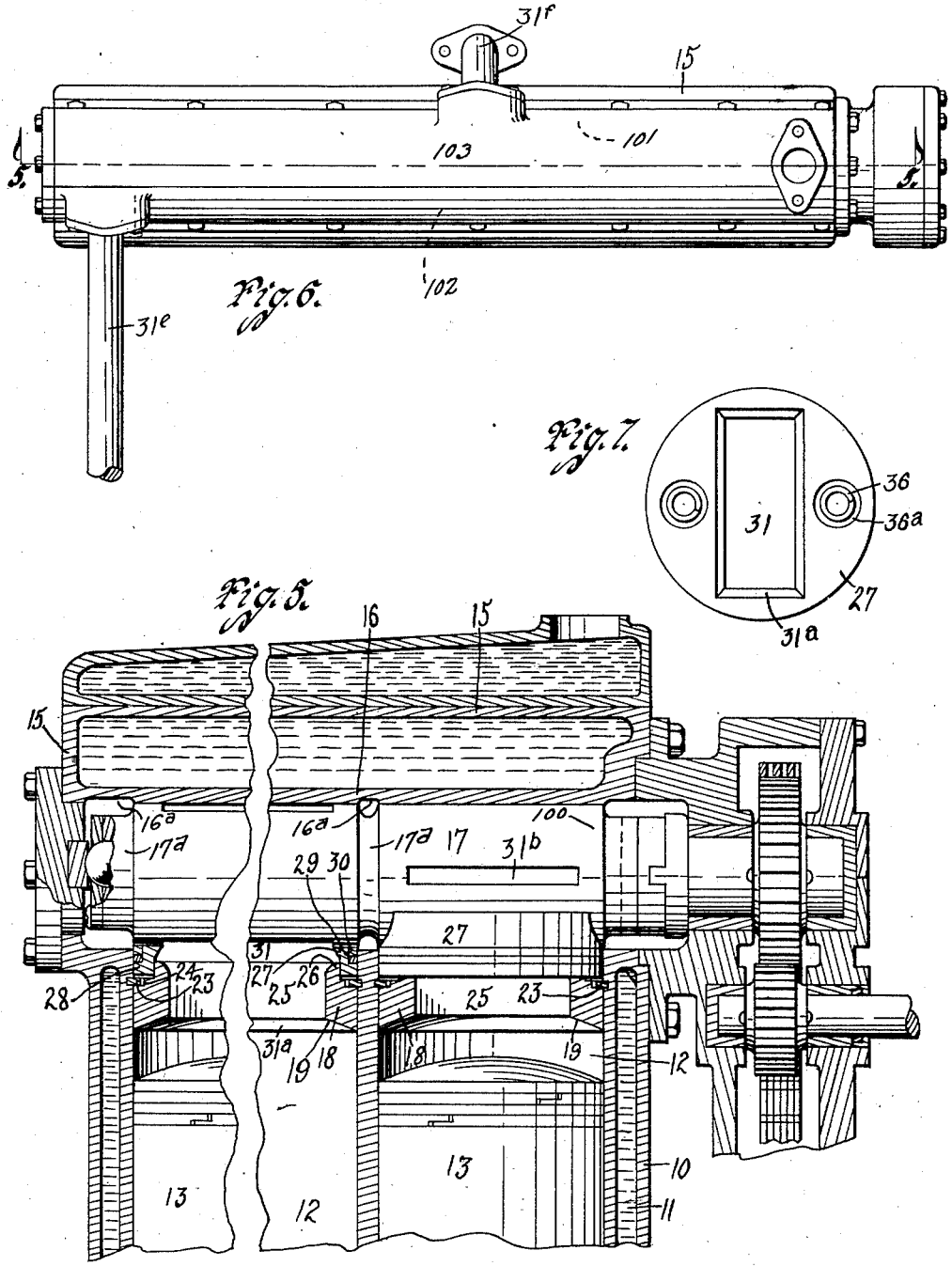

Patented May 6, 1930

1,757,302

UNITED STATES PATENT OFFICE

PEARL G. FRAZIER, OF ANKENY, IOWA

ENGINE AND VALVE STRUCTURE

Application filed August 2, 1926. Serial No. 126,446.

My invention relates to an engine and valve structure of the type employing a rotary valve for controlling the intake and exit of fuel and exhaust gases.

It is recognized that there are some advantages in using a rotary valve in connection with an internal combustion engine. Where, however, a rotary valve is employed, certain problems peculiar to that structure arise. One of them is due to the difficulty of maintaining a tight seating of the valve under varying conditions of expansion and contraction of the valve itself and of its receiving chamber. If the valve is originally tightly seated in its casing, then if it expands a little more than the casing, it is liable to bind or stick. If on the other hand, the valve is originally installed somewhat loosely in the casing, there is likely to be a loss of compression, at certain times during the operation of the engine.

To meet the problem arising from expansion and contraction of the valve and its casing, it has heretofore been suggested that a spring-pressed movable valve casing portion or shoe or the like be employed. Such a structure has partially solved the problem by affording a tight joint at all times, and yet by allowing the movable member to give when the valve expands, and thus avoiding the sticking or binding of the valve and allowing the movable member to follow the valve for affording a tight connection and avoiding loss of compression.

The use of a movable valve casing or shoe, however, has given rise to certain new difficulties and problems. One of these problems in particular results from the fact that pressure from the cylinder directly against the movable valve casing member especially during the explosion stroke causes the movable member to bind too tightly against the valve and imposes great friction on the valve and load on the engine.

It is my purpose to provide in a combustion engine of the type using a rotary valve a movable valve casing member or shoe, and to interpose between it and the interior of the cylinder a shield or head member fixed in position and adapted to receive the greater part of the impact or pressure of the compression and explosion of the fuel for thus relieving the movable member from such impact or pressure, and thus greatly reduce the friction on the rotary valve.

Another purpose of my invention is to provide in a valve structure of the kind mentioned, a valve casing member, on the opposite side of the valve from the shoe, which is a trifle larger than the valve and which is a little wider between its side edges than the chord of the circle of the valve between such edges, and further which extends less than half way around the valve so that expansion of the valve will not cause it to stick at the sides, at the same time the shoe affords a tight joint around the ports.

A further object is to provide a valve structure including a valve provided with a single port only for each cylinder for intake and exhaust so that the intake cools the valve.

Still another purpose is to provide in the valve, a port slightly tapered toward its ends to facilitate scavenging and to reduce or avoid the accumulation of carbon around the inside of the port at its end.

Another feature of my invention lies in providing the passage to the valve port with walls at right angles to the valve for affording better capacity and reducing the tendency to push the shoe from the valve.

Other objects of the present device are to provide inlet and outlet passages through the engine head from the valve with a minimum variation from a direct line to the cylinder and to provide a novel manifold connected with said passages.

In this connection, my invention consists of the structure mentioned and of such details and peculiar arrangement of parts which involve novelty and contribute other desirable results mentioned.

With these and other objects in view, my invention consists in the construction, arrangement and combination of the various parts of my engine and valve structure, whereby the objects contemplated are attained, as hereinafter more fully set forth, pointed out in my claims, and illustrated in the accompanying drawings, in which:

Figure 1 is a vertical, transverse, sectional view through a portion of an internal combustion engine embodying my invention.

Figure 2 is a detail, plan view taken on the line 2—2 of Figure 1, parts being broken away and parts being shown in section.

Figure 3 is a perspective view of one of the protecting shields of a removable type.

Figure 4 is a vertical, sectional view of a portion of an engine embodying a slightly modified form of my invention.

Figure 5 is a vertical longitudinal sectional view through the engine and valve structure.

Figure 6 is a top or plan view of the manifold; and

Figure 7 is an inverted plan view of one of the shoes.

In the drawings herewith, wherein I have illustrated a form in which my invention may be embodied, I have used the reference numeral 10 to indicate generally the engine block having the water jacket 11 and the cylinders 12.

In each cylinder is a piston 13 from which the connecting rod 14 extends. The cylinder head may be made somewhat longer at its upper end than usual, to provide room for the shoe and shield hereinafter mentioned. The engine has the removable head 15. In the upper part of the head 15 is formed the upper portion 16 of a casing or cage for a rotary valve 17. This valve casing 16 extends less than 180 degrees, or half way around the valve and is cored about .001 larger than the valve and is even a little wider between its side edges 16ª to avoid binding or sticking the valve.

In the upper part of the cylinder is mounted a shield or false head or baffle 18, the under surface of which is preferably concave as shown at 19. The shield or false head 18 may be removable or may be cast integral with the cylinder block, as may be desired.

In Figures 1 and 3, I have shown the shield or false head 18 in the form of a removable member provided with the bolt holes 20 to receive a screw bolt 21, by which it may be locked in place. The head or shield 18 when of the removable type is of such size as to be inserted in the upper end of the cylinder and slid downwardly into position. It may be set at slightly varying heights in the cylinder for thus regulating somewhat the compression.

It will, of course, be appreciated that there will be tremendous pressure at times on the under side of the shield 18, which would tend to shear the bolts 21. In order to resist this pressure, I have provided the following structure:

In the upper surface of the shield 18 at its periphery is an annular rabbet 22, which receives an ordinary split resilient ring 23. On the interior of the cylinder wall at the proper height is an annular groove 24, shown for instance in Figure 1. When the shield 18 is slipped into position, the ring 23 will snap outwardly and spring into the groove 24, and will serve as a lock to prevent upward movement of the shield 18 and to resist pressure tending to move the shield 18 upwardly.

The shield 18 has a suitable opening 25 therein, which may be substantially rectangular as shown and is elongated lengthwise of the valve.

A peripheral rib 26 projects upwardly from the shield 18 around the opening 25, as shown in Figures 1 and 3.

For affording the lower part of the casing for the valve 17, I have provided in the upper end of each cylinder above each shield 18 a shoe or movable casing member 27, of a diameter to fit into the cylinder as shown.

Each shoe 27 has at its outer edge the annular wall 28 preferably provided with an external groove 29 in which is seated an ordinary expansion ring 30.

Each shoe 27 has an opening or passage 31 to register with the opening 25.

Extending downwardly around each of said openings 31 is the inner wall 32, the lower end of which overlaps the outer face of the flange 26, as shown in Figure 1.

The upper surface of the shoe 27 is grooved as at 33 to receive the lower part of the valve 17.

Resting on the shoe 27 on each side of the valve 17 and extending upwardly flush with the upper end of the cylinder is suitable lubricant absorbent 34 such as felt.

Between the cylinder and the head 15 is a gasket 35, which projects inwardly from the cylinder wall toward the valve but terminates somewhat short of the valve and overlies the absorbent 34. Oil is furnished to the absorbent 34 through passages 34ª and short passages 34ᵇ. The oil may be supplied from the crank case by a pressure system or pump not shown, to the passages 34ᵇ and these passages may discharge surplus at the front of the engine for oiling gears and the like and for return to the crank case.

It has been noted that the valve casing member 16 extends less than 180° around the valve. The head 15 of the engine is cut away at each side of the valve for a short distance to make this possible, as indicated at 16ª.

It will be noted therefore that the absorbent felt 34 extends downwardly below the horizontal center of the valve. Since the felt lies immediately on top of the shoe, it follows that if the valve or the shoe wear, the parts will follow the valve upwardly and tend to spread the felt and keep it pressed tightly against the valve.

The valve seat portion 16 of the under side of the head 15 does not constitute a full half cylinder, as is clearly seen in Figure 1, but fits around about 120° of the shaft for example. Thus there is left a space on each side of the valve between the casing portion 16 and the shoe 27. This structure as mentioned in describing the casing member 16 contributes to avoiding sticking the valve.

The flange 32 fits snugly on the outside of the flange 26. In recesses 36ª in the under side of the shoe 27 are suitable springs 36, which abut against the shield 18 and the casing member 27 yieldingly for thus snugly pressing the casing member 27 against the valve. The shoe 27 has some vertical play to enable the maintenance of a tight joint with the valve and to permit adjustment of the shield vertically in different installations.

It will be seen that with a structure of the kind herein described, there will be a minimum direct pressure against the movable valve casing member 27 tending to force it into engagement with the shaft 17.

The greater part of the upper pressure within the cylinder 12 will be exerted against the shield 18. At the same time, the movable valve casing member 27 is automatically adjustable to take care of expansion and contraction of the parts and to compensate for wear.

This structure is of particular importance in a rotary valve stucture.

It will be noted that the shoe is of the same diameter as the cylinder, so that it may be inserted directly into the cylinder. This makes the process of boring the cylinder easier. I have found that by making the shoe of the diameter of the cylinder, it is possible to make the port or opening 31 longer and narrower. This portion, it may be understood, is elongated parallel with the axis of the rotary valve.

By providing a shoe of substantially the same diameter as the cylinder, the port may be made long enough to get proper capacity for the quick passage of the proper amount of fuel during the rotation of the valve.

At the same time, the post may be made narrow enough to afford proper timing and to permit the valve to be rotated once for four revolutions of the crank shaft.

This structure makes for quicker opening of the ports and enables me to use a smaller valve and shorten the distance of travel of fuel and exhaust gases. It also makes it possible to reduce the necessary lap of the shoe and the casing portion 16 with the advantages thereof already mentioned.

When the long opening, however, is provided for by making the shoe of the same diameter as the piston, it is obvious that there is a considerable area on the underside of the shoe, which if it were not for my false head or shield or baffle 18 would be subjected to the tremendous pressure of the gases during the explosion stroke. This pressure would tend to cause the shoe to bind against the valve and would greatly increase the amount of power necessary to operate the valve, if it were not for the provision of the shield 18, which protects the shoe against much of that pressure.

The shield also affords a means against which the springs 36 may abut.

At this time, it may be well to mention a detail of construction, which I think is of some importance.

It will be noted that the walls of the shoe are inclined at the upper part of the opening 31, so that they abut against the valve substantially at right angles thereto. With this construction, I find there is less likelihood of forcing the shoe away from the valve by pressure, than where the walls of the opening 31 are vertical. These beveled walls are indicated at 31ª in Figure 1. The beveled wall portions 31ª take some pressure from the cylinder which pressure helps to keep the shoe snugly seated against the valve and makes it possible to use springs of less tension.

The feature just mentioned also gives greater capacity for the supply of fuel and the discharge of the exhaust gases than if the port 31 were of the size throughout shown for its end adjacent to the valve.

Another feature, which may be mentioned, is found in the shape of the passage 31ᵇ through the valve. This passage is elliptical in longitudinal cross section. This shape of the passage affords greater capacity, and I find that where it is employed, the passage seems to clean itself at its ends of accumulated carbon.

It will be noted that the head 15 has extending away from the valve, as nearly as possible in line with the axis of the cylinder below, the inlet and exhaust passages 31ᶜ and 31ᵈ leading to the intake and exhaust passages 101 and 102 in the detachable twin manifold 103. The manifold 103 has between said passages 101 and 102 the compartment 104 arranged in communication with the water jacket in the head of the engine for thus cooling the exhaust and warming the inlet passage through the manifold. Leading to the inlet passage 101 is the pipe 31ᶠ and leading from the exhaust passage 102 is the exhaust pipe 31ᵉ.

By removing the manifold, it is possible to look through the valve for inspection.

I preferably provide back of the absorbent felt or the like 34 above the shoe 27, the leaf or other springs 34ª for exerting a constant yielding pressure tending to hold the felt against the valve.

It should perhaps be mentioned that the valve 17 is formed with portions 17ª of reduced diameter at its ends and between the successive shoes. In other words, the valve 17 has portions of greater diameter for coacting with each shoe, and each of these portions is just of sufficient length to extend across a shoe.

On account of this structure, there is no likelihood of the shoes wearing grooves in the valve.

The upper valve casing member 16 is provided with portions 16ª corresponding in width to the portions 17ª of the valve 17, which are cut away as shown in Figure 5.

On account of this structure, the valve will not cut grooves in the casing portion 16.

It is desirable that the shoes should not wear grooves in the valve, and that the valve should not wear grooves in the casing, because when such grooves are formed, the shoulder of the groove in the valve would tend to climb on the shoe and the valve would tend to climb on the shoulder in the casing with the result that the seal between the valve and its bearing would be broken.

The engine block below the valve 17 between the shoes is formed of course in the shape of the valve casing member, which is of such size as to allow clearance between it and the valve in all positions of the movement of the shoes and thus to permit the proper functioning of the shoes, as indicated for instance at 100 in Figure 2.

In Figure 4, I have shown a slightly modified form of my invention in which the cylinder 12 is provided with an integral shield 40. Instead of the member 27, there is provided a member 41 fitted into the upper part of the cylinder and having an opening 42 similar to the opening 31.

The downwardly projecting flanges 43 is slidably received in the opening 40ª in the shield 40.

The wall of the shoe around the upper part of the opening 42 is provided with the grooves 43ª, so shaped that the upper portions of the wall are arranged at right angles to the surface of the valve for the purpose already explained.

Otherwise the structure is similar to that already described.

I claim as my invention:

1. In a structure of the class described, an engine cylinder, a head thereon having formed in it the upper portion of a valve casing, a rotary valve projected into said casing, a shield in the cylinder provided with an opening, said cylinder and shield having respectively a groove and an adjacent rabbet, a resilient ring in the rabbet and groove, for preventing movement of the shield away from the cylinder.

2. In a structure of the class described, an engine cylinder, a head thereon having formed in it the upper portion of a valve casing, a rotary valve projected into said casing, a shield in the cylinder provided with an opening, and a movable shoe or valve casing member between the shield and the head yieldably pressed toward the valve, said shield being removable and having in its upper surface at its periphery a rabbet, the interior of said cylinder being provided with a groove and a resilient ring received in said groove and rabbet.

3. In a structure of the class described, an engine having a cylinder, an upper valve casing member above the cylinder, an adjustable shoe forming a lower valve casing member, a rotary valve received in said valve casing members having a passage therethrough, said shoe having a coacting passage communicating with the cylinder, the shoe being of substantially the same diameter as the cylinder, a shield in the cylinder below the movable valve casing members provided with an opening registering with the opening in the shoe, the passage in the valve being elliptical in the line of its axis.

4. In a structure of the class described, an engine having a head and a cylinder, said engine and head having a bore for receiving a rotary valve, the bore in the head having a portion to engage the valve and extending less than 180° around the valve, the bore of the engine below the valve being normally spaced somewhat from the valve, a shoe interposed between the cylinder and the valve and forming a casing member extending less than 180° around the valve, means for yieldingly pressing the shoe against the valve, and lubricant absorbent on the shoe resting above the shoe adjacent to the valve.

5. In a structure of the class described, an engine having a cylinder and having above the cylinder an upper valve casing member, a valve, a yieldingly pressed shoe below the valve for engaging the valve, said shoe extending less than 180° around the valve, a lubricant absorbent resting on the shoe, having its greater portion below the horizontal center of the valve, whereby when the parts wear and the shoe follows the valve upwardly the absorbent material will be pressed tightly against the valve.

6. In a structure of the class described, an engine having a body and a head and having a cylinder, a valve casing portion in said head, a shoe above the cylinder yieldingly pressed against the valve, lubricant absorbent material resting on the shoe against the valve, means for supplying oil to the absorbent member, and yielding means tending to press the absorbent member against the valve.

Des Moines, Iowa, July 26, 1926.

PEARL G. FRAZIER.